(12) United States Patent
Pirrung et al.

(10) Patent No.: US 11,261,392 B2
(45) Date of Patent: *Mar. 1, 2022

(54) AQUEOUS POLYMER DISPERSIONS, A METHOD FOR THEIR PREPARATION AND THE USE THEREOF AS POUR-POINT DEPRESSANTS FOR CRUDE OIL, PETROLEUM, AND PETROLEUM PRODUCTS

(71) Applicant: BASF SE, Ludwigshafen am Rhein (DE)

(72) Inventors: Frank Pirrung, Ludwigshafen am Rhein (DE); Edward Bohres, Ludwigshafen am Rhein (DE); Jennifer Anne Jackson, Houston, TX (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/646,406

(22) PCT Filed: Sep. 10, 2018

(86) PCT No.: PCT/EP2018/074268
§ 371 (c)(1),
(2) Date: Mar. 11, 2020

(87) PCT Pub. No.: WO2019/048663
PCT Pub. Date: Mar. 14, 2019

(65) Prior Publication Data
US 2020/0291319 A1 Sep. 17, 2020

(30) Foreign Application Priority Data
Sep. 11, 2017 (EP) .................................. 17190394

(51) Int. Cl.
| | |
|---|---|
| *C10L 1/196* | (2006.01) |
| *B01F 17/00* | (2006.01) |
| *C08L 33/08* | (2006.01) |
| *C10L 1/10* | (2006.01) |
| *C10L 1/12* | (2006.01) |
| *C10L 10/14* | (2006.01) |
| *C10L 10/16* | (2006.01) |
| *C08F 2/26* | (2006.01) |
| *C08F 20/18* | (2006.01) |
| *C10L 1/198* | (2006.01) |
| *C08F 2/56* | (2006.01) |

(Continued)

(52) U.S. Cl.
CPC ........ *C10L 1/1963* (2013.01); *B01F 17/0021* (2013.01); *B01F 17/0064* (2013.01); *C08F 2/26* (2013.01); *C08F 2/56* (2013.01); *C08F 20/18* (2013.01); *C08L 33/08* (2013.01); *C10L 1/106* (2013.01); *C10L 1/125* (2013.01); *C10L 1/1985* (2013.01); *C10L 10/14* (2013.01); *C10L 10/16* (2013.01); *C08L 2201/50* (2013.01); *C08L 2203/40* (2013.01); *C10L 1/1826* (2013.01); *C10L 1/2683* (2013.01); *C10L 2250/06* (2013.01)

(58) Field of Classification Search
CPC ...... C10L 1/1963; C10L 1/1985; C10L 1/106; C10L 1/125; C10L 10/14; C10L 10/16; C10L 1/1826; C10L 1/2683; C10L 2250/06; C10L 1/1616; C10L 1/2475; C08F 2/56; C08F 20/18; C08F 2/26; C08F 220/1818; C08F 220/1808; C08F 2/24; B01F 17/0021; B01F 17/0064; C08L 33/08; C08L 2201/50; C08L 2203/40; C10M 2209/084; C10M 173/02; C10M 145/14; C10N 2020/04; C10N 2020/09; C10N 2030/02; C10N 2050/011; C09K 8/58; C09K 8/584; C09K 8/588; C09K 8/54

See application file for complete search history.

(56) References Cited

U.S. PATENT DOCUMENTS

| | | | | |
|---|---|---|---|---|
| 1,440,283 A | * | 12/1922 | Du Bois ................. | B23P 15/06 29/888.072 |
| RE33,008 E | | 8/1989 | Ruffner et al. | |
| 5,418,278 A | | 5/1995 | Ritter et al. | |

(Continued)

FOREIGN PATENT DOCUMENTS

| | | | | |
|---|---|---|---|---|
| CN | 101547999 A | | 9/2009 | |
| EP | 0344818 A2 | * | 12/1989 | ............... C09K 8/32 |

(Continued)

OTHER PUBLICATIONS

International Preliminary Report on Patentability received for PCT Patent Application No. PCT/EP2018/074268, dated Aug. 23, 2019, 17 pages.

(Continued)

*Primary Examiner* — Pamela H Weiss
(74) *Attorney, Agent, or Firm* — Faegre Drinker Biddle & Reath LLP

(57) ABSTRACT

The invention relates to aqueous polymer dispersions comprising at least one polymer obtainable by the reaction of at least one monomer M1 of the general formula (I): $H_2C=CH-C(O)OR$, wherein R is an unbranched alkyl chain comprising from 18 to 22 carbon atoms, and optionally at least one monomer M2. The invention relates moreover to a method for the preparing of such aqueous polymer dispersion and the use thereof as pour point depressant for crude oil, petroleum, and petroleum products.

17 Claims, No Drawings

(51) Int. Cl.
*C10L 1/26* (2006.01)
*C10L 1/182* (2006.01)

(56) References Cited

U.S. PATENT DOCUMENTS

| | | | |
|---|---|---|---|
| 5,542,951 | A | 8/1996 | Antwerpen et al. |
| 6,284,037 | B1 * | 9/2001 | Sapper ............... C09D 7/65 106/499 |
| 10,851,323 | B2 * | 12/2020 | Braeuer ............ C10M 145/14 |
| 2010/0025290 | A1 | 2/2010 | Feustel et al. |
| 2012/0305091 | A1 * | 12/2012 | Milligan ............ C10M 145/14 137/13 |
| 2013/0023453 | A1 | 1/2013 | Feustel et al. |
| 2014/0131039 | A1 * | 5/2014 | Reichenbach-Klinke .............. C09K 8/584 166/270.1 |
| 2014/0165457 | A1 | 6/2014 | Castro et al. |
| 2015/0376390 | A1 | 12/2015 | Kosugi et al. |
| 2018/0355266 | A1 | 12/2018 | Castro et al. |
| 2019/0024011 | A1 | 1/2019 | Braeuer et al. |
| 2020/0172674 | A1 | 6/2020 | Mueller-Cristadoro et al. |
| 2020/0308471 | A1 | 10/2020 | Bohres |

FOREIGN PATENT DOCUMENTS

| | | | | |
|---|---|---|---|---|
| GB | 2058825 | A * | 4/1981 | ............. C09K 8/524 |
| JP | 07-041795 | A | 2/1995 | |
| WO | WO-9851731 | A1 * | 11/1998 | .......... C10M 145/40 |

OTHER PUBLICATIONS

International Search Report and Written Opinion received for PCT Patent Application No. PCT/EP2018/074268, dated Oct. 16, 2018, 11 pages.

* cited by examiner

AQUEOUS POLYMER DISPERSIONS, A METHOD FOR THEIR PREPARATION AND THE USE THEREOF AS POUR-POINT DEPRESSANTS FOR CRUDE OIL, PETROLEUM, AND PETROLEUM PRODUCTS

CROSS-REFERENCE TO RELATED APPLICATIONS

This application is a national stage application (under 35 U.S.C. § 371) of PCT/EP2018/074268, filed Sep. 10, 2018, which claims benefit of European Application No, 17190394,1, filed Sep. 11, 2017, both of which are incorporated herein by reference in their entirety.

The invention relates to aqueous polymer dispersions comprising at least one polymer obtainable by the reaction of reactive monomers M comprising at least one monomer M1 of the general formula $H_2C=CH-C(O)OR$ (I), wherein R is an unbranched alkyl chain comprising from 18 to 22 carbon atoms, and optionally at least one monomer M2. The invention relates moreover to a method for the preparation of such aqueous polymer dispersions and the use thereof as pour-point depressant and/or wax inhibitors and/or wax dispersant for crude oil, petroleum, and petroleum products.

Underground mineral oil formations typically have relatively high temperatures. After the production of the crude oil to the surface, the crude oil produced thereof cools down to a greater or lesser degree according to the production temperature and the storage and transport conditions.

According to their origin, crude oils have different proportions of waxes, which consist essentially of long-chain n-paraffins. According to the type of crude oil, the proportion of such paraffins may typically be 1 to 30% by weight of the crude oil. When the temperature goes below a particular level in the course of cooling, the paraffins can crystallize, typically in the form of platelets. The precipitated paraffins considerably impair the flowability of the oil. The platelet-shaped n-paraffin crystals can form a kind of house-of-cards structure which encloses the crude oil, so that the crude oil ceases to flow, even though the predominant portion is still liquid. The lowest temperature at which a sample of oil still flows in the course of cooling is referred to as the pour point ("yield point"). For the measurement of the pour point, standardized test methods are used. Precipitated paraffins can block filters, pumps, pipelines and other installations or be deposited in tanks, thus entailing a high level of cleaning.

The deposit temperature of oil deposits is generally above room temperature, for example 40° C. to 100° C. Crude oil is produced from such deposits while still warm, and it naturally cools more or less quickly to room temperature in the course or after production, or else to lower temperatures under corresponding climatic conditions. Crude oils may have pour points above room temperature, so such that crude oils of this kind may solidify in the course of or after production.

It is known that the pour point of crude oils can be lowered by suitable additives. This can prevent paraffins from precipitating in the course of cooling of produced crude oil. Suitable additives firstly prevent the formation of said house-of-cards-like structures and thus lower the temperature at which the crude oil solidifies. In addition, additives can promote the formation of fine, well-crystallized, non-agglomerating paraffin crystals, such that undisrupted oil transport is ensured. Such additives are referred to as pour point depressants or flow improvers.

Paraffin inhibitors or wax inhibitors refer to those substances intended to prevent the deposition or paraffin waxes on surfaces in contact with crude oils or other wax-containing oils and/or mineral oil products. Wax dispersants refer to substances that intend to keep the wax particles from agglomerating.

WO 03/014170 A1 describes acrylic polymer latex dispersions as additives for inhibiting paraffin deposits in crude oils. The dispersions may comprise co-solvents.

WO 2006/075109 A1 relates to aqueous emulsions suitable for the inhibition of the deposition of paraffins contained in crude petroleum oil and as additives for the deparaffining of crude oils in order to obtain lubrication oils for example. The aqueous emulsions described therein comprises copolymers of alkyl(meth)acrylates(s) comprising between 6 and 60 carbon atoms, optionally further alkyl (meth)acrylates and/or (meth)acrylamides, a co-solvent or an co-dispersant and surfactants and/or protective colloids. The emulsion is prepared by radical aqueous polymerization of an emulsion or a miniemulsion of the used monomers and the further components in water. Miniemulsion polymerization is also described in US 2011/0184121 A1 for the preparation of drag reducers.

WO 2014/095408 A1 describes the use of polymer formulations as pour-point depressants for crude oil, mineral oils or mineral oil products, wherein the formulation comprises at least two different solvents with a flash point of at least 60° C. and a polymeric composition. The polymer composition is obtainable by radical polymerization of at least one alkyl(meth)acrylate of the formula $H_2C=CR^1-COOR^2$, wherein $R^1$ is H or methyl and $R^2$ is a linear alkyl radical with 12 to 60 carbon atoms in the presence of at least one ethylene-vinyl ester copolymer.

WO 2014/095412 A1 relates to polymer compositions obtainable by radical polymerization of at least two different alkyl(meth)acrylates in the presence of at least one ethylene-vinyl ester copolymer and the use thereof as pour-point depressant for crude oil, mineral oils or mineral oil products. The mixture of alkyl(meth)acrylates comprises at least one alkyl(meth)acrylate of the formula $H_2C=C(R^2)COOR^3$, wherein $R^2$ is H or methyl, and $R^3$ is a linear alkyl chain having 12 to 16 carbon atoms, and at least one alkyl(meth) acrylate of the formula $H=C(R^2)-COOR^4$, wherein $R^2$ is as defined above and $R^4$ is selected from the group of radicals $R^{4a}$, $R^{4b}$ and $R^{4c}$, wherein $R^{4a}$ is a linear alkyl chain having 1 to 11 carbon atoms, $R^{4b}$ is a branched alkyl chain having 4 to 60 carbon atoms and $R^{4c}$ is a cyclic alkyl radical having 5 to 20 carbon atoms.

EP 0 359 061 A1 describes the use of an aqueous emulsion of a copolymer, comprising (meth)acrylate ester of a higher alcohol containing from 16 to 30 carbon atoms, and ethylenically unsaturated mono and dicarboxylic acids having up to 10 carbon atoms or their anhydrides and optionally (meth)acrylate esters of short-chain alcohols having up to 8 carbon atoms for reducing the pour-point and flow-point of hydrocarbon mixtures.

The international patent application PCT/EP2017/055423 describes aqueous polymer dispersions as pour point depressants with good properties at ambient temperature. The dispersions comprise surfactants, and protective colloids. Exemplary dispersions comprise a modified styrene-acrylate polymer as protective colloid and a non-ionic surfactant ($C_{16}C_{18}$ saturated fatty alcohol ethoxylate with 18 EO units).

The use of copolymers comprising (meth)acrylate esters of higher alcohol containing at least 16 carbon atoms and further monomers, for example maleic anhydride or (meth) acrylic acid for reducing the pour-point and flow-point of crude oil and mineral oil fractions comprising paraffins is described in DE 38 07 394 A1 and DE 38 07 395.

Despite the known pour-point depressants there is still a need for further pour-point depressing compositions with improved application properties.

Known pour point depressants and/or wax Inhibitors frequently are solid or wax-like at ambient temperature and therefore require a heating step to obtain them liquefied. Additives for crude oil are necessarily used at the production sites of crude oil. Such production sites also may be offshore platforms which furthermore may be located in cold regions, e.g. arctic regions. Pour point depressants are generally supplied as concentrated solutions and can be formulated for use in the desired manner by the users on site. The products supplied should be liquid in order to avoid melting on site, and the solutions should also remain stable over a long period and not have a tendency to phase separation, such that they can be stored with great simplicity. In addition, at elevated temperature, like 50° C., pour point depressants containing formulations in form of dispersions may tend to show creaming or sedimentation. Also solutions may crystallize at room temperature in organic liquids and heating is required in order to be provided in liquid form.

It is therefore an object of the present invention to provide a pour-point depressant with improved handling properties and preferably at low, ambient and especially also at elevated temperature and good pour point depressive properties. It is also an object of the present invention to provide improved wax inhibitors and/or wax dispersants or at least with similar wax inhibiting properties compared to the state of the art.

This objective is achieved by an aqueous polymer dispersion comprising water and
a) 10 to 60% by weight based on the dispersion of at least one polymer P obtainable by the reaction of reactive monomers M, wherein the reactive monomers M comprise
50 to 100% by weight of at least one monomer M1 of the general formula (I)

$$H_2C=CH-C(O)OR \qquad (I)$$

wherein R is an unbranched alkyl chain comprising from 18 to 22 carbon atoms; and
0 to 50% by weight of at least one monomer M2, which is different from monomer M1,
wherein the amounts of the monomers M1 and M2 are each based on the total amount of all reactive monomers M;
wherein the polymer P has a weight-average molecular weight $M_w$ of 20,000 to 150,000 g/mol;
and wherein the polymer P is present in the form of particles having an average particle size $d_{50}$ of from 50 nm to 1000 nm;
b) 5 to 60% by weight based on the total amount of the aqueous polymer dispersion of at least one with water miscible solvent;
c) 5 to 40% by weight based on the total amount of the aqueous polymer dispersion of at least one hydrophobic organic solvent;
d) 0.1 to 20% by weight based on the total amount of the aqueous polymer dispersion of at least one ionic surfactant.

A further aspect of the present invention is method for the preparation of the aqueous polymer dispersion.

A further aspect of the invention is the use of the aqueous polymer dispersion as pour point depressant for crude oil, petroleum and petroleum products.

It has been found that the aqueous polymer dispersion according to the invention has good application properties in view of pour-point depression and application safety and moreover has good handling properties. Especially exposition of higher temperatures, like 50° C. during transport and storage, does not negatively affect the properties. Particularly, the present aqueous polymer dispersion is liquid at ambient temperature, whereby the handling properties are good. Moreover, the polymer dispersion has a high solid content and therefore has a reduced solvent-content.

Aqueous polymer dispersion

The aqueous polymer dispersion according to the invention comprises
a) 10 to 60% by weight based on the total amount of the aqueous polymer dispersion of at least one polymer P;
b) 5 to 60% by weight based on the total amount of the aqueous polymer dispersion of at least one with water miscible solvent;
c) 5 to 40% by weight by weight based on the total amount of the aqueous polymer dispersion of at least one hydrophobic organic solvent;
d) 0.1 to 20% by weight by weight based on the total amount of the aqueous polymer dispersion of at least one ionic surfactant.

The aqueous polymer dispersion may contain one or more further components different from the components a), b), c), and d).

An example for a further component is a polymerization initiator, which is used as trigger for the polymerization of the reactive monomers M to form at least one polymer P. Depending on the used amounts and the nature of the specific initiator the aqueous polymer dispersion may comprise from 0.1 to 5%, preferably 0.1 to 4%, particularly preferably 0.2 to 3.0% by weight and more preferably 0.2 to 2.5% by weight based on the total amount of reactive monomers M of at least one polymerization initiator. In the context of the aqueous polymer dispersion the term "polymerization initiator" refers to the polymerization initiator in the form it is used to start the polymerization as well as in the form it is present after the polymerization reaction, i.e. in the form of its decomposition products and other modified forms. Initiation can be carried out using methods well known in the art, like thermal decomposition of the initiator or decomposition triggered by a redox partner.

The aqueous polymer dispersion according to the invention of course comprises water in such an amount that all components of the dispersion including water results in 100% by weight. Preferably, the amount of water is from 1% by weight to 79.9% by weight, more preferably, form 10% by weight to 60% by weight, even more preferably, form 20% by weight to 50% by weight, even more preferably, form 30% by weight to 40% by weight.

In a preferred embodiment the polymer composition according of the invention consists of water, and the components a), b), c), d) and additives required for polymerisation.

Suitable for the aqueous polymer dispersion is the use of distilled water, tap water, or deionized water, preferred are distilled water and deionized water, particularly preferably deionized water is used.

In a preferred embodiment, the amounts by weight of a) to d) based on the total amount of the aqueous polymer dispersion are 10% to 50% a), 5% to 20% b), 10% to 30% c) and 1% to 10% d); more preferably, 20% to 40% a), 10% to 15% b), 15% to 20% c) and 1% to 5% d).

Polymer P

The aqueous polymer dispersion according to the present invention comprises 10 to 60% by weight, preferably 10 to 50% by weight, preferably 15 to 50% by weight, particularly preferably 25 to 40% by weight, and also particularly preferably 25 to 35% by weight based on the total amount of the aqueous polymer dispersion of at least one polymer P. The dispersion according to the present invention of course can contain two or more different polymers P, for example three, four or five different polymers P.

The at least one polymer P is obtainable by the reaction, i.e. by the polymerization, of reactive monomers M, wherein the reactive monomers M comprise at least one monomer M1 and optionally at least one monomer M2, which is different from monomer M1.

Accordingly, the polymer P is a homopolymer of M1, a copolymer of two or more different monomers M1, a copolymer of one M1 and one or more M2 or a copolymer of more than one M1 and one or more M2. Preferably, the polymer P is a copolymer of two or more, especially three, monomers M1 copolymer of two or more, especially three, M1 and one or more (especially one) M2.

The term "reactive monomers M" for the purpose of the present invention refers to monomers M, which are polymerizable under the reaction conditions prevailing during the preparation of polymer P.

The reactive monomer M may comprise up to 50% by weight based on the total amount of reactive monomers M, preferably up to 39% by weight, preferably up to 28% by weight, preferably up to 17% by weight, more preferably up to 6% by weight of further monomers different from monomers M1 and M2. However, in particularly preferred embodiments the reactive monomers M consist of monomers M1 and M2.

The at least one polymer P is obtained by the reaction of reactive monomers M, comprising, preferably consisting of,
  50 to 100% by weight, preferably 60 to 99% by weight, more preferably 70 to 98% by weight, more preferably 80 to 97% by weight, particularly preferably 90 to 96% by weight and for example 95% by weight of at least one monomer M1 of the general formula (I); and
  0 to 50% by weight, preferably from 1 to 40% by weight, preferably from 2 to 30% by weight, preferably from 3 to 20% by weight, particularly preferably from 4 to 10% by weight and for example 5% by weight of at least one monomer M2, which is different from monomer M1,
  wherein the amounts of the monomers M1 and M2 are each based on the total amount of all reactive monomers M.

The at least one polymer P is obtained by the reaction of reactive monomers M, comprising, preferably consisting of,
  50 to 100% by weight, preferably 60 to 100% by weight, more preferably 70 to 100% by weight, more preferably 80 to 100% by weight, particularly preferably 90 to 100% by weight and for example 95% by weight of at least one monomer M1 of the general formula (I); and
  0 to 50% by weight, preferably from 0 to 40% by weight, preferably from 0 to 30% by weight, preferably from 0 to 20% by weight, particularly preferably from 0 to 10% by weight and for example 5% by weight of at least one monomer M2, which is different from monomer M1,
  wherein the amounts of the monomers M1 and M2 are each based on the total amount of all reactive monomers M.

The at least one monomer M1 is of the general formula $H_2C=CH-C(O)OR$ (I), wherein R is an unbranched alkyl chain comprising from 18 to 22 carbon atoms.

The at least one monomer M1 can comprise only one monomer M1 or a mixture of two or more different monomers M1.

In a preferred embodiment of the invention, the at least one monomer M1 is a mixture, comprising, preferably consisting of,
  40 to 55% by weight, based on the total amount of monomers M1, of monomers M1 of formula (I), wherein R is an unbranched alkyl chain comprising 18 carbon atoms;
  10 to 15% by weight, based on the total amount of monomers M1, of monomers M1 of formula (I), wherein R is an unbranched alkyl chain comprising 20 carbon atoms; and
  35 to 45% by weight, based on the total amount of monomers M1, of monomers M1 of formula (I), wherein R is an unbranched alkyl chain comprising 22 carbon atoms.

The preferred mixture given above is for example available as Behenyl acrylate of BASF SE (BEA 1822, BEA 1822 F).

Preferred monomers M2 are selected from the group consisting of acrylate monomers of the general formula (II), $$H_2C=CH-C(O)OR^3 \qquad (II),$$

wherein $R^3$ is a branched or unbranched alkyl chain comprising from 1 to 12 carbon atoms, optionally substituted with a hydroxyl group;
methacrylate monomers of the general formula (III)

$$H_2C=C(CH_3)-C(O)OR^4 \qquad (III),$$

wherein $R^4$ is a branched or unbranched alkyl chain comprising from 1 to 12 carbon atoms, optionally substituted with a hydroxyl group;
and vinylic aromatic monomers like e.g. styrene, vinyltoluene and alphamethylstyrene.

In a preferred embodiment, the at least one monomer M2 is an acrylate monomer of the general formula (II) or a methacrylate monomer of the general formula (III), particularly preferred are acrylate monomers of the general formula (II).

In a preferred embodiment the at least one monomer M2 is a monomer of the general formula (II), wherein $R^3$ is a branched or unbranched alkyl chain comprising 4 to 8 carbon atoms. More preferred $R^3$ is a branched or unbranched alkyl chain comprising 4 or 8 carbon atoms. Particularly preferably $R^3$ is a branched alkyl chain comprising 8 carbon atoms or an unbranched alkyl chain comprising 4 carbon atoms. Thus, in a particularly preferred embodiment of the invention the at least one monomer M2 is butyl acrylate or 2-ethylhexylacrylate.

Preferably, the at least one monomer M2 is styrene, 2-ethylhexylacrylate, methylmethacrylate, 2-hydroxyethylmethacrylate or n-butylacrylate.

The at least one monomer M2 can comprise only one monomer M2 or a mixture of two or more different monomers M2. In a particularly preferred embodiment the at least one monomer M2 comprise exclusively one monomer M2.

In a preferred embodiment the at least one polymer P is obtainable by the reaction of exclusively monomers M1 of the general formula (I). In another preferred embodiment the at least one polymer P is obtained by the reaction of monomers M1 of the general formula (I) and a monomer M2.

The obtained polymer P therefore comprises monomer units of at least one monomer M1 and optionally monomer units of at least one, preferably one, monomer M2.

In one embodiment the polymer P according to the invention refers to a polymer comprising monomer units of only one monomer M1. In a further embodiment polymer P comprises monomer units of two or more different monomers M1. In a preferred embodiment polymer P comprises monomer units of three or more, particularly preferably three, different monomers M1 of the general formula (I).

In a further embodiment, polymer P refers to a polymer comprising monomer units of only one monomer M1 and monomer units of only one monomer M2. In a further embodiment, polymer P refers to a polymer comprising monomer units of two or more different monomers M1 and monomer units of two or more different monomer M2. In a preferred embodiment polymer P comprises monomer units of at least three, preferably three, different monomers M1 of the general formula (I) and of one monomer M2.

In a preferred embodiment of the invention, the at least one polymer P of the invention comprises monomer units from three different monomers M1, wherein the three different monomer M1 are monomers M1 of formula (I), wherein R is an unbranched alkyl chain comprising 18 carbon atoms; monomers M1 of formula (I), wherein R is an unbranched alkyl chain comprising 20 carbon atoms; and monomers M1 of formula (I), wherein R is an unbranched alkyl chain comprising 22 carbon atoms.

The polymer P is present in the aqueous polymer dispersion in the form of particles having an average particle size $d_{50}$ from 50 nm to 1000 nm, preferably 75 nm to 400 nm, preferably from 100 nm to 300 nm and more preferably from 100 nm to 250 nm, in particular from 125 nm to 210 nm.

Determining the average particle size $d_{50}$ can be preferably effected by Column Hydrodynamic Chromatography (HDC). The skilled person in general is familiar with said method.

The determination of the average particle size $d_{50}$ according to HDC can be, e. g., effected with a particle size distribution analyzer of the type PL-PSDA from Polymer Laboratories operating on the principle of packed column hydrodynamic chromatography. Thereby, an eluent is continuously pumped through the system at a constant flow rate. The components of the sample are separated by an HDC mechanism in a cartridge and their concentration is measured by a UV detector, e. g. at a wavelength of 254 nm. The system can be calibrated using a series of particle size standards.

As packed column can be used Cartridge PL0850-1020 (until 1200 nm), filled with polystyrene beads. The eluent is pumped with a constant flow rate (e. g. of 2 ml/min, at a pressure of 3 MPa) through the system. Before the measurement begins the sample typically is filtered and diluted (absorption of 0.3 AU/volume unit).

The eluent typically comprises surfactants and salts in demineralized water. An exemplary eluent comprises
0.24 g/l sodium dihydrogen phosphate
0.5 g/l sodium dodecyl sulfate
2 g/l polyoxyethylen (23) laurylether (Brij®35)
9.2 g/l sodium azide, a
and has an pH value of about 5.5 to 6.

The polymer P of the invention has a weight-average molecular weight $M_w$ of 20 000 to 150 000 g/mol, preferably 20 000 to 100 000 g/mol.

Determining the weight average molecular weight is familiar to a person skilled in the art and is effected more particularly by gel permeation chromatography (GPC) according to DIN 55672-1:1995-02, respectively size exclusion chromatography (SEC), using standard polymers of defined molecular weight.

With water miscible solvent

The aqueous dispersion of the invention comprises 5 to 60% by weight, preferably 5 to 20% by weight, particularly preferably 10 to 15% by weight, based on the total amount of the aqueous polymer dispersion, of at least one with water miscible solvent.

Examples of water-miscible solvents include especially alcohols such as mono alcohols, e.g., methanol, ethanol and n-propanol, and glycols, e.g., ethylene glycol and derivatives thereof, butyl ethylene glycol, 1,2-propylene glycol, butyl diethylene glycol or butyl triethylene glycol.

In a preferred embodiment of the invention, the at least one with water miscible solvent is a glycol, especially 1,2-propylene glycol.

Ionic Surfactant

The aqueous polymer dispersion comprises 0.1 to 20% by weight, based on the total amount of the aqueous polymer dispersion, preferably 1 to 10% by weight, particularly preferably 1 to 5% by weight of at least one ionic surfactant.

The polymerization is carried out in the presence of at least one or more ionic surfactants, which help to maintain the dispersion of the monomers in the aqueous medium.

The ionic surfactant or surfactants are anionic or cationic or—in case more than one ionic surfactant is present—a mixture of both. Preferably, the ionic surfactant is an anionic surfactant.

Customary anionic surfactants are for example alkali metal and ammonium salts of alkyl sulfates (alkyl radical: $C_8$ to $C_{12}$), of sulfuric monoesters of ethoxylated alkanols (EO degree: 3 to 30, alkyl radical: $C_{12}$ to $C_{18}$) and ethoxylated alkylphenols (EO degree: 3 to 50, alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$).

Suitable anionic surfactants further include compounds of the general formula (Ia)

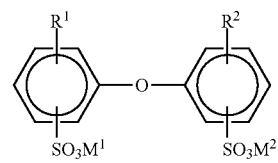

where $R^1$ and $R^2$ are H atoms or $C_4$ to $C_{24}$ alkyl that are not H atoms at the same time, and M1 and M2 can be alkali metal ions and/or ammonium ions. In the general formula (Ia), $R^1$ and $R^2$ are preferably linear or branched alkyl radicals of 6 to 18 carbon atoms and more particularly of 6, 12 and 16 carbon atoms, or hydrogen, with the proviso that $R^1$ and $R^2$ are not both an H atom at the same time. $M^1$ and $M^2$ are each preferably sodium, potassium or ammonium, of which sodium is particularly preferred. Particularly advantageous are compounds (Ia) in which $M^1$ and $M^2$ are both sodium, $R^1$ is a branched alkyl radical of 12 carbon atoms and $R^2$ an H atom or $R^1$. Technical grade mixtures are frequently used that include a 50 to 90 wt % fraction of monoalkylated product, for example Dowfax® 2A1 (trademark of Dow Chemical Company). Compounds (I) are common knowledge, for example from U.S. Pat. No. 4,269, 749, and commercially available.

Suitable cation-active surfactants are generally $C_6$-$C_{18}$-alkyl-, -alkylaryl- or heterocyclyl containing primary, secondary, tertiary or quaternary ammonium salts, alkanolammonium salts, pyridinium salts, imidazolinium salts, oxazolinium salts, morpholinium salts, thiazolinium salts and also salts of amine oxides, quinolinium salts, isoquinolinium salts, tropylium salts, sulfonium salts and phosphonium salts. Examples which may be mentioned are dodecylammonium acetate or the corresponding sulfate, the sulfates or acetates of the various 2-(N,N,N-trimethyl-ammonium) ethyl paraffinic acid esters, N-cetylpyridinium sulfate, N-laurylpyridinium sulfate and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate and also the gemini surfactant N,N-(lauryldimethyl)ethylene-diamine disulfate, ethoxylated tallow-alkyl N-methylammonium sulfate and ethoxylated oleylamine (for example Uniperol® AC from BASF SE, about 11 ethylene oxide units). Numerous further examples are given in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is beneficial when the anionic counter-groups have very low nucleophilicity, for example perchlorate, sulfate, phosphate, nitrate and carboxylates, for example acetate, trifluoroacetate, trichloroacetate, propionate, oxalate, citrate, benzoate, and also conjugated anions of organosulfonic acids, for example methylsulfonate, trifluoromethylsulfonate and para-toluenesulfonate, further tetrafluoroborate, tetraphenyl-borate, tetrakis(pentafluorophenyl)borate, tetrakis[bis(3,5-trifluoromethyl)phenyl]-borate, hexafluorophosphate, hexafluoroarsenate or hexafluoroantimonate.

In a particularly preferred embodiment of the invention, the at least one surfactant is an anionic surfactant, preferably of the general formula (IV)

$R^5$—O-(D)$_l$-(B)$_m$-(A)$_n$-XY$^-$M$^+$ , (IV) where $R^5$ is a linear or branched, saturated or unsaturated, aliphatic and/or aromatic hydrocarbon radical having 8 to 30 carbon atoms, A is ethyleneoxy,
B is propyleneoxy, and
D is butyleneoxy,
l is from 0 to 30,
m is from 0 to 30 and
n is from 0 to 30,
X is $(CH_2)_a[C(O)]_b(CH_2)_c$, where a and c are independently from 0 to 4 and b 0 or 1;
M$^+$ is a cation, and
Y$^-$ is selected from the group of $SO_3^-$, $PO_3^{2-}$ and $C(O)O^-$, where the A, B and D groups may be distributed randomly, alternatingly, or in the form of two, three, four or more blocks in any sequence, and wherein the sum of l+m+n is in the range from 0 to 30.

The $R^5$ radical is a straight-chain or branched (preferably straight-chained) aliphatic and/or aromatic (preferably aliphatic) hydrocarbon radical having 8 to 30 carbon atoms, preferably 8 to 22 carbon atoms, more preferably 10 to 20 carbon atoms, even more preferably 10 to 18 carbon atoms.

In a particularly preferred embodiment of the invention, the $R^5$ radical is $C_{13}C_{15}$ oxoalcohol (especially 67% $C_{13}$ and 33% $C_{15}$).

In the above formula (IV), A means ethyleneoxy. B means propyleneoxy and D means butyleneoxy.

In the above-defined general formula I, m and n are each integers. It is, however, clear to the person skilled in the art in the field of polyalkoxylates that this definition is the definition of a single surfactant in each case. In the case of presence of surfactant mixtures or surfactant formulations which comprise a plurality of surfactants of the general formula, the numbers l, m and n are each mean values over all molecules of the surfactants, since the alkoxylation of alcohol with ethylene oxide and/or propylene oxide and/or butylene oxide in each case affords a certain distribution of chain lengths. This distribution can be described in a manner known in principle by the polydispersity D. $D=M_w/M_n$, is the quotient of the weight-average molar mass and the number-average molar mass. The polydispersity can be determined by means of the methods known to those skilled in the art, for example by means of gel permeation chromatography.

In the above general formula l is from 0 to 30, preferably 0 or 1, more preferably 0.

In the above general formula m is from 0 to 30, preferably 0 to 3, more preferably 0.

In the above general formula n is from 0 to 30, preferably 1 to 30, more preferably 2 to 10.

According to the invention, the sum of l+m+n is a number in the range from 0 to 30, preferably in the range from 1 to 30, more preferably in the range from 1 to 10.

The ethyleneoxy (A), propyleneoxy (B) and butyleneoxy (D) group(s) are randomly distributed, alternatingly distributed, or are in the form of two, three, four, five or more blocks in any sequence.

In the above general formula (IV), X is $(CH_2)_a[C(O)]_b(CH_2)_c$, where a and c are independently from 0 to 4 and b 0 or 1. In a preferred embodiment a, b and c are 0, i.e. X is a chemical bond. In another preferred embodiment, a is 0, b is 0 and c is 1 or 2. In another preferred embodiment, a is 0, b is 1 and c is 2.

In the prior art cited, there is often no specific information with regard to the description of $C_4$ epoxides. This may generally be understood to mean 1,2-butylene oxide, 2,3-butylene oxide, isobutylene oxide, and mixtures of these compounds. The composition is generally dependent on the $C_4$ olefin used, and to a certain degree on the oxidation process. However 1,2-butylene oxide is preferred.

In the above general formula Y is $SO_3^-$, $PO_3^{2-}$ or $C(O)O^-$. For a, b, c=0, $SO_3^-$ and $PO_3^{2-}$ result in sulfate and phosphate groups. In case c=0 and a and/or c>0, b=0, $SO_3^-$ and $PO_3^{2-}$ result in sulfonate and phosphonate groups.

Preferably Y=$SO_3^-$, with a=0, b=0, c=0 or 1 to 4 (preferably 1 or 2), preferably c=0.

Preferably Y=$PO_3^{2-}$, with a=0, b=0, c=0 or 1 to 4 (preferably 1 or 2), preferably c=0.

Preferably, Y=$C(O)O^-$, with a=0, b=0, c=1 or 2; or a=0, b=1, c=1 or 2; preferably a=0, b=1, c=1 or 2.

In the above formula M$^+$ is a cation, preferably a cation selected from the group of Na$^+$, K$^+$, Li$^+$, NH$_4^+$, H$^+$, Mg$^{2+}$ and Ca$^{2+}$. Preferably, M$^+$ is Na$^+$.

Preferably, the at least one surfactant is an anionic surfactant of the general formula (IVa)

$R^5$—O—(CH$_2$CH$_2$O)$_n$XY (IVa)

wherein $R^5$, n, X and Y have the meaning as indicated above.

In a particularly preferred embodiment of the present invention the at least one anionic surfactant of the general formula (IV) is $C_{13}C_{15}$—O—(CH$_2$CH$_2$O)$_5$—SO$_3$Na or —PO$_3$Na$_2$, for example derived from Lutensol® AO5 of BASF SE or n-C$_{12}$—O—(CH$_2$CH$_2$O)$_4$—SO$_3$Na, for example available as Disponil® FES 32 of BASF SE.

Further Surfactants

The aqueous polymer dispersion of the present invention may comprise further surfactants other than the above ionic surfactants. Examples are nonionic surfactants.

Customary nonionic surfactants are for example ethoxylated mono-, di- and trialkylphenols (EO degree: 3 to 50, alkyl radical: $C_4$ to $C_{12}$) and also ethoxylated fatty alcohols (EO degree: 3 to 80, alkyl radical: $C_8$ to $C_{36}$). Examples thereof are the Lutensol® A brands ($C_{12}C_{14}$ fatty alcohol ethoxylates, EO degree: 3 to 8), Lutensol® AO brands ($C_{13}C_{15}$ oxo process alcohol ethoxylates, EO degree: 3 to 30), Lutensol® AT brands ($C_{16}C_{18}$ fatty alcohol ethoxylates, EO degree: 11 to 80), Lutensol® ON brands ($C_{10}$ oxo process alcohol ethoxylates, EO degree: 3 to 11) and the Lutensol® TO brands ($C_{13}$ oxo process alcohol ethoxylates, EO degree: 3 to 20) from BASF SE.

However it is preferred that the aqueous polymer dispersion of the present invention does not comprise nonionic surfactants.

Hydrophobic Organic Solvent

The aqueous polymer dispersion according to the invention preferably comprises 5 to 40% by weight, preferably 10 to 30% by weight and particularly preferably 15 to 20% by weight based on the total amount of the aqueous polymer dispersion of at least one hydrophobic organic solvent.

In a preferred embodiment the weight ratio of the at least one polymer P and the at least one hydrophobic organic solvent is at least 1:1, preferably the aqueous polymer dispersion comprises more polymer P than hydrophobic organic solvent.

The at least one hydrophobic organic solvent should be non-polymerizable and may have significant regulating action in the course of free-radical polymerization, for example regulation of the molecular mass distribution of the at least one polymer P.

Preferably, the at least one hydrophobic organic solvent is an aromatic or aliphatic hydrocarbon or mixture thereof.

Examples of suitable solvents comprise saturated aliphatic hydrocarbons, saturated aliphatic alcohols or esters of saturated aliphatic carboxylic acids and saturated aliphatic alcohols.

Preferred solvents have a flashpoint of at least 60° C. Examples of alcohols comprise aliphatic alcohols having at least 8 carbon atoms, such as 1-octanol, 1-decanol or 1-dodecanol. Examples of esters comprise esters of saturated fatty acids having at least 8 carbon atoms with saturated aliphatic alcohols, for example methyl laurate or methyl stearate. Technical mixtures of various aliphatic esters are commercially available. In a further embodiment of the invention, it is possible to use esters of aliphatic or cycloaliphatic dicarboxylic acids, for example dialkyl esters of cyclohexane-1,2-dicarboxylic acid, such as diisononyl cyclohexane-1,2-dicarboxylate.

In a preferred embodiment of the invention, the at least one solvent is selected from saturated aliphatic solvents or solvent mixtures having a flashpoint of at least 60° C. These may be either paraffinic or naphthenic, i.e. saturated cyclic, hydrocarbons. Saturated aliphatic hydrocarbons having a flashpoint of at least 60° C. are high-boiling and typically have a boiling point of at least 175° C.

Examples of suitable hydrocarbons comprise n-undecane (flashpoint 60° C., boiling point 196° C.) or n-dodecane (flashpoint 71° C., boiling point 216° C.). It is possible with preference to use technical mixtures of hydrocarbons, for example mixtures of paraffinic hydrocarbons, mixtures of paraffinic and naphthenic hydrocarbons or mixtures of isoparaffins. It will be apparent to those skilled in the art that technical mixtures may still comprise small residues of aromatic or unsaturated hydrocarbons. The content of aromatic and/or unsaturated hydrocarbons should, however, be generally <1% by weight, preferably <0.5% by weight and more preferably <0.1% by weight.

Technical mixtures of saturated aliphatic solvents are commercially available, for example technical mixtures of the Shellsol®D series or the Exxsol®D series.

It is of course also possible to use mixtures of various hydrophobic organic solvents. In a preferred embodiment of the invention, the at least one hydrophobic organic solvent comprises exclusively saturated aliphatic solvents or solvent mixtures.

To execute the invention, in addition, aromatic solvents or solvent mixtures, preferably having a flashpoint of at least 60° C. can be used. Such hydrocarbons are high-boiling and typically have a boiling point of at least 175° C. In principle, it is possible to use any aromatic hydrocarbons having a flashpoint of at least 60° C., for example naphthalene. It is possible with preference to use technical mixtures of aromatic hydrocarbons. Technical mixtures of aromatic solvents are commercially available, for example technical mixtures of the Shellsol®A series or the Solvesso® series.

Also preferred, the at least one hydrophobic organic solvent is toluene or xylene.

Preferably, the at least one hydrophobic organic solvent is an aromatic or aliphatic hydrocarbon or a mixture thereof.

Preferably the at least one hydrophobic organic solvent is at least one saturated aliphatic solvent, at least one aromatic solvent or a mixture of two or more thereof, with the provision, that the at least one hydrophobic organic solvent has a flashpoint of at least 60° C., or toluene or xylene.

Particularly preferably the at least one hydrophobic organic solvent is at least one saturated aliphatic solvent, at least one aromatic solvent or a mixture of two or more thereof, with the provision, that the at least one hydrophobic organic solvent has a flashpoint of at least 60° C.

Protective Colloid

In one embodiment of the invention, the aqueous polymer dispersion of the present invention may comprise less than 10%, more preferably less than 5%, even more preferably less than 3%, even more preferably less than 1%, preferably less than 0.1%, by weight based on the total amount of monomers M of at least one protective colloid or the dispersion is free of protective colloids, especially one or more protective colloids described below.

Surprisingly, it has been found that for the high temperature properties of the aqueous polymer dispersion the presence of a protective colloid is disadvantageous. Accordingly it is preferred, that the dispersion comprises less than 10% of protective colloid, more preferably, is free of protective colloids.

The at least one protective colloid can be present in the aqueous polymer dispersion since polymer P can be prepared in the presence of the protective colloid, which acts as a stabilizer during the polymerization of the reactive monomers M. However in view of the disadvantageous effect on high temperature properties, especially transport and storage, at a temperature of at least 50° C. it is preferred to provide a dispersion with only a low amount or without protective colloid.

The protective colloid is a water-soluble polymeric compound which, on solvation, is capable of stabilizing dispersions of water-insoluble polymers. In contrast to emulsifier and/or surfactants, they generally do not lower the interfacial tension between polymer particles and water. The number-average molecular weight of the protective colloid can be greater than 1000 g/mol or greater than 2000 g/mol, and can be less than 50,000 g/mol or less than 10,000 g/mol. For example the number-average molecule weight of the protective colloid can be from 1000 to 100,000 g/mol, from 5000 to 50,000 g/mol or form 10,000 to 20,000 g/mol.

A comprehensive description of protective colloids is given in Houben-Weyl, Methoden der organischen Chemie, Volume XIV/1, Makromolekulare Stoffe [Macromolecular compounds], Georg-Thieme-Verlag, Stuttgart, 1961, pages 411 to 420. Protective colloids contemplated include, for example, amphiphilic polymers that include hydrophobic groups and hydrophilic groups. These can be natural polymers, such as starch, or synthetic polymers.

The protective colloid can be formed from at least 40% by weight of nonionic principal monomers, defined in more detail below, and also from a second kind of monomer, selected from ethylenically unsaturated acid monomers. The protective colloid can, furthermore, be formed optionally from additional monomers such as nonionic monomers. The protective colloid can be produced from 40% to 80% or from 50% to 80% by weight of principal monomers selected from the group consisting of $C_1$ to $C_{20}$ alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, and mixtures of these monomers.

Principal monomers for the protective colloid are, for example, (meth)acrylic acid alkyl esters with a $C_{1-10}$ alkyl radical, such as methyl methacrylate, methyl acrylate, n-butyl acrylate, ethyl acrylate, 2-ethylhexyl acrylate, and mixtures thereof. For example, the principal monomers can be mixtures of the (meth)acrylic acid alkyl esters. Vinyl esters of carboxylic acids having 1 to 20 carbon atoms include, for example, vinyl laurate, vinyl stearate, vinyl propionate, versatic acid vinyl esters, vinyl acetate, and mixtures thereof. Suitable vinylaromatic compounds include styrene, alpha- and para-methylstyrene, alpha-butylstyrene, 4-n-butylstyrene, 4-n-decylstyrene, vinyltoluene, and mixtures thereof. Examples of nitriles include acrylonitrile and methacrylonitrile. The vinyl halides include ethylenically unsaturated compounds substituted by chlorine, fluorine or bromine, such as vinyl chloride and vinylidene chloride. Vinyl ethers include, for example, vinyl ethers of alcohols comprising 1 to 4 carbon atoms such as vinyl methyl ether and vinyl isobutyl ether. Hydrocarbons having 4 to 8 carbon atoms and two olefinic double bonds include butadiene, isoprene, and chloroprene. In some embodiments, principal monomers for the protective colloid include $C_{1-10}$ alkyl acrylates and methacrylates or $C_{1-8}$ alkyl acrylates and methacrylates, vinylaromatics such as styrene and alpha-methylstyrene, and mixtures thereof. In some embodiments, the principal monomers include methyl acrylate, methyl methacrylate, ethyl acrylate, n-butyl acrylate, n-butyl methacrylate, n-hexyl acrylate, octyl acrylate, 2-ethylhexyl acrylate, 2-propylheptyl acrylate, styrene, alpha-methylstyrene, and mixtures of these monomers.

The protective colloid can include at least 15% (for example from 15% to 60%, from 20% to 55%, or from 30% to 50%) by weight of ethylenically unsaturated acid monomers. Ethylenically unsaturated acid monomers include, for example, ethylenically unsaturated carboxylic acids, ethylenically unsaturated sulfonic acids, and vinylphosphonic acid. In some embodiments, the ethylenically unsaturated carboxylic acids include alpha, beta-monoethylenically unsaturated monocarboxylic and dicarboxylic acids having 3 to 6 carbon atoms in the molecule. Examples include acrylic acid, methacrylic acid, itaconic acid, maleic acid, fumaric acid, crotonic acid, vinylacetic acid, vinyllactic acid, and mixtures thereof. Suitable ethylenically unsaturated sulfonic acids include, for example, vinylsulfonic acid, styrenesulfonic acid, acrylamidomethylpropane-sulfonic acid, sulfopropyl acrylate, sulfopropyl methacrylate, and mixtures thereof. In some embodiments, the ethylenically unsaturated acid monomers include acrylic acid, methacrylic acid, and a mixture thereof. The acid monomers can be used in the form of the free acids and also in a form partially or fully neutralized with suitable bases, for the polymerization. In some embodiments, aqueous sodium or potassium hydroxide solution or ammonia is used as a neutralizing agent.

In one embodiment, the protective colloid has a number-average molecular weight of 1000 to 10000 g/mol. In some embodiments, the protective colloid is derived from monomers including one or more $C_{1-20}$ alkyl (meth)acrylates (e.g., butyl acrylate, ethyl acrylate and methyl methacrylate) and one or more ethylenically unsaturated carboxylic acids (e.g., acrylic acid), and can optionally further include styrene. Preferably, the at least one protective colloid is derived from monomers including one or more $C_{1-20}$ alkyl (meth)acrylates and one or more ethylenically unsaturated carboxylic acids.

The protective colloid in said embodiment can have a glass transition temperature $T_g$ from −20° C. to 60° C. or from −10° C. to 40° C.

The glass transition temperature can be determined by differential scanning calorimetry (DSC) by measuring the midpoint temperature using ASTM D3418-08.

The at least one protective colloid can be obtained by the reaction, i.e. by the polymerization, of 15 to 40% by weight of at least one monomer A1 selected from the group consisting of acrylic acid, methacrylic acid, crotonic acid, fumaric acid, maleic acid, maleic anhydride, 2-methylmaleic acid and itaconic acid, and 60 to 85% by weight of at least one monomer A2 selected form the group consisting of styrene, alpha-methyl styrene, o- or p-vinyltoluene, p-acetoxystyrene, p-bromostyrene, p-tert-butylstyrene, o-, m- or p-chlorostyrene, methyl methacrylate, n-butyl acrylate, 2-ethylhexyl acrylate, tert-butyl acrylate, tert-butyl methacrylate, ethyl methacrylate, isobutyl methacrylate, n-hexyl acrylate, cyclohexyl methacrylate, acrylonitrile, methacrylonitrile, tert-butyl vinyl ether or cyclohexyl vinyl ether, wherein the given amounts of monomers A1 and A2 are each based on the total amount of the at least one protective colloid.

and more preferably of 15 to 30% by weight of at least one monomer A1 selected from the group consisting of acrylic acid, methacrylic acid, crotonic acid, fumaric acid, maleic acid, maleic anhydride, 2-methylmaleic acid and itaconic acid, and 70 to 85% by weight of at least one monomer A2 selected form the group consisting of styrene, alpha-methyl styrene, o- or p-vinyltoluene, p-acetoxystyrene, p-bromostyrene, p-tert-butylstyrene, o-, m- or p-chlorostyrene, methyl methacrylate, n-butyl acrylate, 2-ethylhexyl acrylate, tert-butyl acrylate, tert-butyl methacrylate, ethyl methacrylate, isobutyl methacrylate, n-hexyl acrylate, cyclohexyl methacrylate, acrylonitrile, methacrylonitrile, tert-butyl vinyl ether or cyclohexyl vinyl ether, in polymerized form, wherein the given amounts of monomers A1 and A2 are each based on the total amount of the at least one protective colloid.

The at least one protective colloid can be obtained by the reaction, i.e. by the polymerization of 15 to 40% by weight of acrylic acid and/or methacrylic acid, and 60 to 85% by weight of methyl methacrylate, n-butyl acrylate, 2-ethylhexyl acrylate, styrene and/or alpha-methyl styrene;

wherein the given amounts are each based on the total amount of the at least one protective colloid.

The at least one protective colloid can be obtained by the reaction, i.e. by the polymerization of 15 to 30% by weight of acrylic acid, methacrylic acid, or a mixture thereof; and 70 to 85% by weight of methyl methacrylate, n-butyl acrylate, 2-ethylhexyl acrylate, styrene, alpha-methyl styrene, or a mixture of two or more thereof, in polymerized form, wherein the given amounts are each based on the total amount of the at least one protective colloid.

Such polymers and methods for their preparation are described in WO 2014/146921 A1 and are commercially available for example as Joncryl™ of BASF SE. Said protective colloids according to the WO 2014/146921 A1 have preferably a glass transition temperature of at least 60° C., preferably at least 80° C. and not more than 130° C. Particularly preferably the protective colloid has a glass transition temperature of 80 to 110° C. The weight-average molecular weight $M_w$ of said polymer is in the range of 1000 to 25000 g/mol, preferably 7500 to 22500 g/mol. The acid number is preferably in the range of 50 to 300, preferably 100 to 230 and particularly preferably in the range of 150 to 230. The acid number for the purpose of the invention is measured according to DIN EN ISO 2114.

If present at all, the at least one protective colloid can be applied in the form of an aqueous suspension or solution. The at least one protective colloid can be applied in the partially neutralized or fully neutralized form. Preferably the at least one protective colloid is applied in the fully neutralized form. The partial or full neutralization of the carboxylic acid groups of the at least one protective colloid is effected by common and known bases, such as alkali metal hydroxide, such as sodium hydroxide or potassium hydroxide, alkaline earth metal, such as calcium hydroxide, ammonia, amines, such as diethanolamine, triethanolamine or ethylenediamine. Preferably the partial, and most preferably the fully, neutralized protective colloid is applied. Sodium hydroxide and/or potassium hydroxide and/or ammonia are used most preferably for the neutralization of the acid groups of the at least one protective colloid.

Method for the preparation of the dispersion

The present aqueous dispersion is preferably prepared by means of miniemulsion polymerization, i.e. a miniemulsion of the reactive monomers M solved in a hydrophobic organic solvent, comprising monomer(s) M1 and optionally monomer(s) M2, which are water insoluble, is polymerized in an aqueous medium. That is M1 and optionally M2 are a disperse phase in water.

Accordingly, a method for the preparation of the aqueous polymer dispersion according to the invention is provided comprising the steps of a) preparation of an aqueous monomer dispersion comprising a1) 10 to 60% by weight based on the total amount of the resulting aqueous polymer dispersion of reactive monomers M, wherein the reactive monomers M comprise 50 to 100% by weight based on the total amount of the reactive monomers M of at least one monomer M1 of the general formula (I)

$$H_2C=CH-C(O)OR \qquad (I), and$$

0 to 50% by weight based on the total amount of the reactive monomers M of at least one monomer M2, which is different from monomer M1, wherein the amounts of the monomers M1 and M2 are each based on the total amount of all reactive monomers M;

a2) 5 to 40% by weight based on the total amount of the resulting aqueous polymer dispersion of at least one hydrophobic organic solvent;

a3) 5 to 60% by weight based on the total amount of the resulting aqueous polymer dispersion of at least one with water miscible solvent;

a5) 0.1 to 20% by weight based on the total amount of the resulting aqueous polymer dispersion of at least one ionic surfactant; and b) ultrasonic processing or homogenization of the aqueous monomer dispersion of step a);

c) addition of at least one polymerization initiator.

The preferred embodiments given above for the aqueous polymer dispersion apply accordingly for the method for the preparation of the aqueous monomer dispersion.

Methods for the miniemulsion polymerization are known to the skilled person and are for example described in D. Crespy et al., Beilstein J. Org. Chem. 2010, 6, 1132 and Schork et al., Adv. Polym. Sci. 2005, 175, 129. Therefore the skilled person is able to select suitable reaction conditions and reaction vessels to prepare the inventive aqueous polymer dispersion by means of miniemulsion polymerization.

Preferably, step a) refers to the mixing of reactive monomers M, at least one with water miscible solvent, at least one hydrophobic organic solvent, at least one ionic surfactant and water.

In a preferred embodiment step a) of the method according to the invention comprises the step of mixing a first solution, comprising the reactive monomers M and the at least one hydrophobic organic solvent with a second solution, comprising the at least one surfactant, water and the at least one with water miscible solvent.

Alternatively, the components can be placed consecutively into the reactor, i.e. to the solution of the monomers M in one hydrophobic organic solvent are added first at least one surfactant, then water, followed by the water micible solvent, or in a reverse way.

Step b) refers to the ultrasonic processing or homogenization of the aqueous monomer dispersion of step a). The aqueous monomer dispersion in step a) can be regarded as a macroemulsion. By ultrasonic processing or homogenization of said macroemulsion the desired and preferred miniemulsion is obtained.

Thus, preferably, the aqueous monomer dispersion is obtained in form of a miniemulsion after step b), preferably by ultrasound.

In general, miniemulsions can be produced by the application of high shear to break up the macroemulsion comprising the reactive monomers M into submicron monomer droplets. For the purpose of the present invention, high shear is provided in step b) by ultrasonic processors or mechanical high pressure homogenizers.

Combined with the high shear a stabilizing system is used to stabilize the obtained submicron monomer droplets, particularly to avoid the coalescence of the droplets and to prevent Ostwald ripening.

The present miniemulsion is typically mainly stabilized by with at least one surfactant.

In a preferred embodiment step b) is carried out for at least 5 minutes, preferably for at least 10 minutes.

Step b) of the inventive method can be carried out in an ultrasonic processor, for example an ultrasonic processor of Dr. Hilscher GmbH, or a mechanical homogenizer, for example a Gaulin APV homogenizer, preferably in a high pressure homogenizer.

Step b) preferably refers to the ultrasonic processing or homogenization of the aqueous monomer dispersion of step a) to obtain a miniemulsion, wherein the reactive monomers M are dissolved in the solvent and forms particles having an average particle size $d_{50}$ of 50 nm to 1000 nm, preferably 50 nm to 300 nm, more preferably 80 nm to 200 nm.

In a preferred embodiment step b) is carried out by high pressure homogenizer.

In a particularly preferred embodiment the aqueous monomer dispersion of step a) is treated with ultrasonic for at least 5 minutes, preferably at least 10 minutes.

In a preferred embodiment the method for the preparation of the aqueous polymer dispersion according to the invention is carried out under inert gas atmosphere, for example nitrogen or noble gases or mixtures thereof.

In a preferred embodiment step a) of the inventive method is carried out at a temperature of 30 to 60° C., preferably at ambient temperature.

Preferably, step b) is carried out at a temperature of 30 to 60° C., preferably 50 to 60° C. Since the ultrasonic processing respectively the homogenization may lead to a temperature increase of the treated mixture, step b) is preferably carried out under cooling to ensure that the temperature while step b) does not exceed a temperature of 80° C.

In step c) of the present method at least one polymerization initiator is added to the miniemulsion obtained after the ultrasonic-processing or homogenization in step b).

In a preferred embodiment the mixture obtained in step b) is heated to a temperature in the range from 40 to 90° C., preferably from 50 to 70° C. particularly preferably from 55 to 65° C., before the at least one polymerization initiator is added.

Suitable polymerization initiators are known for the skilled person. In general initiators used in the aqueous emulsion polymerization are suitable for triggering the present polymerization step. Suitable polymerization initiators can be found for example in WO 2013/120752.

In principle, not only peroxides but also azo compounds can be concerned here.

Redox initiator systems also come into consideration, as will be appreciated.

As peroxides there can be used in principle inorganic peroxides, such as hydrogen peroxide or peroxodisulfates, such as the mono- or di-alkali metal or ammonium salts of peroxodisulfuric acid, for example its mono- and disodium, potassium or ammonium salts or organic peroxides, such as alkyl hydroperoxides, for example tert-butyl hydroperoxide, p-mentyl hydroperoxide or cumyl hydroperoxide, and also dialkyl or diaryl peroxides, such as di-tert-butyl or dicumyl peroxide. As azo compound it is essentially 2,2'-azobis (isobutyronitrile), 2,2'-azobis(2,4-dimethyl-valeronitrile) and 2,2'-azobis(amidinopropyl)dihydrochloride (AIBA, corresponds to V-50 from Wako Chemicals) which are used. As oxidizing agents for redox initiator systems it is essentially the abovementioned peroxides which come into consideration. A preferred oxidizing agent is tert-butyl hydroperoxide or peroxodisulfate, for example sodium peroxidisulfate and particularly preferred is tert-butyl hydroperoxide.

The peroxide can typically be provided in a form of a solution, for example an aqueous solution comprising for example 10% by weight based on the oxidizing agent.

As corresponding reducing agents there can be used sulfur compounds of low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of multivalent metals, such as iron(II) sulfate, iron(II) ammonium sulfate, iron(II) phosphate, enediols, such as dihydroxymaleic acid, benzoin and/or ascorbic acid and also reducing saccharides, such as sorbose, glucose, fructose and/or dihydroxyacetone, and acetone sodium bisulfite. A preferred reducing agent is sodium formaldehyde sulfoxylate, also known as sodium hydroxymethylsulfinate (available for example as Rongalit C of BASF SE) and 2-hydroxy-2-sufinatoacetate and 2-hydroxy-2-sufonatoacetate (available as Brüggolit FF6M from Bruggemann Chemical).

In general, the amount of free-radical initiator comprising an oxidizing agent and optionally an reducing agent used is from 0.1 to 7 wt %, preferably 0.5 to 6 wt %, particularly preferably 0.8 to 5.0% by weight and more preferably 1 to 4 wt %, based on the total amount of reactive monomers M.

The inventive method can comprise further optional steps, for example purification steps. An example for a suitable purification step is the filtration of the obtained aqueous polymer dispersion to remove insoluble impurities. However, such steps are not required for the intended use of the polymer dispersion A further object of the present invention is aqueous polymer dispersion obtainable by the method according to the invention as described above.

Use of the dispersion as pour point depressant

The aqueous polymer dispersion according to the present invention can be used in accordance with the invention as pour point depressant for crude oil, mineral oil and/or mineral oil products by adding the aqueous dispersion to the crude oil, petroleum, and petroleum products. In addition, it is of course also possible to use further formulations which act as pour point depressants.

Accordingly another object of the present invention is the use of the aqueous polymer dispersion according to the present invention as pour point depressant for crude oil, mineral oil and/or mineral oil products.

Accordingly another aspect of the present invention is a method for pour point depression comprising the step of adding the aqueous polymer dispersion of the present invention to crude oil, petroleum, and petroleum products.

Pour point depressants reduce the pour point of crude oils, mineral oils and/or mineral oil products. The pour point ("yield point") refers to the lowest temperature at which a sample of oil, in the course of cooling, still just flows. For the measurement of the pour point, standardized test methods are used.

The aqueous dispersion is typically used in such an amount that the polymer P added is 50 to 5000 ppm based on the oil. The amount is preferably 100 to 2000 ppm, more preferably 250 to 1000 ppm. The amounts are based on the polymer P itself, not including any solvents and further compounds in the aqueous dispersion.

In a preferred embodiment of the invention, the oil is crude oil and the aqueous polymer dispersion is injected into a crude oil pipeline or via capillary string into a well bore region. The injection can preferably be effected at the oilfield, i.e. at the start of the crude oil pipeline, but the injection can of course also be effected at another side. More particularly, the pipeline may be one leading onshore from an offshore platform.

The cooling for the crude oil in flowlines from typically wellhead location to the platform and additionally can be injected after process on the platform and transportation to the shore. The cooling effect can be particularly rapid due to the low temperature of the seabed floor 4° C.

In a further embodiment of the invention, the oil is crude oil and the aqueous polymer dispersion is injected into a production well. Here too, the production well may especially be a production well leading to an offshore platform. The injection is preferably effected approximately at the site where oil from the formation flows into the production well. In this way, the solidification of the crude oil in the production well or an excessive increase in its viscosity can be prevented.

Further use of the aqueous dispersion

The aqueous dispersion according to the invention can of course also be used for other purposes.

In a further embodiment of the invention the above-detailed aqueous polymer dispersions are used as wax inhibitors, i.e. to prevent wax deposits on surfaces in contact with crude oil, mineral oil and/or mineral oil products. The use is effected by adding the aqueous dispersion to the crude oil, mineral oil and/or mineral oil products. Preferred aqueous dispersions have already been mentioned, and the manner of use is also analogues to the use as a pour point depressant.

In a further embodiment of the invention the above-detailed aqueous polymer dispersions are used as wax dispersants, i. e. intend to keep the wax particles from agglomerating. The use is effected by adding the aqueous dispersion to the crude oil, mineral oil and/or mineral oil products. Preferred aqueous dispersions have already been mentioned, and the manner of use is also analogues to the use as a pour point depressant and the use as wax inhibitor.

The aqueous polymer dispersion of the present invention can also be used as flow improver.

EXAMPLES

Used starting materials

| | |
|---|---|
| Solvesso ® 150 ND | high boiling aromatic hydrocarbon mixture supplied by ExxonMobil Chemical Company, aromatic hydrocarbon > 99 vol %, initial boiling point 184° C. (ASTM D86), flash point 64° C. (ASTM D93) |
| Behenyl acrylate | isomer mixture of 40-55% by weight of $C_{18}$-alkyl chain, < 15% by weight of $C_{20}$-alkyl chain and 35-45-% by weight of $C_{22}$-alkyl chain, Behenyl acrylate BEA 1822F of BASF SE |
| Protective Colloid | modified styrene-acrylate polymer ($M_w$~8500 g/mol, acid number: 216, $T_g$ = 91° C.), neutralized with $NH_3$, 31% by weight in water, Joncryl 8078 of BASF SE |
| Non-ionic surfactant | $C_{16}C_{18}$ saturated fatty alcohol ethoxylate ($C_{16}C_{18}$—O—$(CH_2CH_2O)_{18}$H, Lutensol ® AT18 as 20% aqueous solution of BASF SE |
| Non-ionic surfactant | $C_{13}C_{15}$ oxo alcohol ethoxylate ($C_{13}C_{15}$—O—$(CH_2CH_2O)_5$H, Lutensol ® AO5 of BASF SE |
| Ionic surfactant | "$C_{12}H_{25}$—O—$(CH_2CH_2O)_4$—$SO_3^-Na^+$ , Disponil FES 32 of BASF SE |
| Redox initiator system | Brüggolit ® FF6M (disodium salts of 2-hydroxy-2-sufinatoacetic acid and 2-hydroxy-2-sufonatoacetic acid) from Brüggemann Chemical L-Ascorbic acid from Sigma-Aldrich Tert-butyl hydroperoxide, 10% in water (PEROXAN BHP-10) from Pergan GmbH |
| Acid function generator | Succinic anhydride and polyphosphoric acid were obtained from Merck KGaA |
| Water soluble solvent | 1,2 Propanediol was obtained from BASF SE |

General instructions:

The particle sizes/particle diameters or particle radii indicated here for the polymer particles are particle diameters as may be determined by means of photon correlation spectroscopy (PCS), also known as quasi-elastic light scattering (QELS) or dynamic light scattering. The average particle diameters D50 constitute the average value of the cumulant analysis (mean of fits). This "mean of fits" is an average, intensity-weighted particle diameter in nm, which corresponds to the weight-average particle diameter. The measurement method is described in the ISO 13321 standard. Processes for this purpose are familiar to the skilled worker, moreover, from the relevant technical literature for example, from H. Wiese in D. Distler, Wässrige Polymerdispersionen, Wiley-VCH 1999, section 4.2.1, p. 40ff and literature cited therein, and also H. Auweter, D. Horn, J. Colloid Interf. Sci. 105 (1985) 399, D. Lilge, D. Horn, Colloid Polym. Sci. 269 (1991) 704 or H. Wiese, D. Horn, J. Chem. Phys. 94 (1991) 6429. The particle diameters indicated here relate to the values determined at 20° C. and 101.325 hPa on 0.001-1% by weight dispersions. The determination of the average particle diameters may also be performed by means of hydrodynamic chromatography (HDC) using a Particle Size Distribution Analyser (PSDA, Varian Deutschland GmbH) with a number 2 (standard) cartridge at a wavelength of 254 nm (measurement temperature 23° C. and measurement time 480 seconds). In the present invention, particle size was determined by using a NANO-flex particle sizer from Microtrac using a 780 nm laser light (3 mW) at a 180° scattering angle. Measurements were done with samples tel quel diluted to the required concentration with demineralized water at room temperature.

The mini-emulsion of the solution of the monomer behenylacrylate, its comonomers in the hydrophobic solvent can be prepared from a OW-macro emulsion of the of the same by subjecting the macro-emulsion to strong shear forces, thereby achieving a comminution of the large droplets of the macro-emulsion to the desired droplet size. The means for transforming a conventional macro-emulsion to a mini-emulsion are known from prior art and can be applied to the a OW-macro emulsion of the of the solution of the monomer behenylacrylate, its comonomers in the hydrophobic solvent. Suitable means have been described e.g. in Prog. Polym. Sci. 2002, 27, 689, US 2006/0287416 and WO 2008/003601 and the literature cited therein. Comminution may be achieved by using high shear force dispersion devices like for example a ultrasonic sound equipment (J. Dispersion Sci. Technology 2002, 23(1-3), 333-349) or a high pressure homogenizer (APV Gaulin homogenizer; Microfluidizer). The emulsification and comminution can be carried out continuously or batchwise. Apparatus for this purpose are known in the art. This is for example described in U.S. Pat. No. 5,108,654.

Treatment with ultrasound was carried out using a Hielscher ultrasound generator using a Sonotrode H14 with 100% power (400 W), while stirring the sample.

Treatment with the Gaulin homogenizer was done with an APV 1000 lab homogenizer from SPX Flow at various pressures indicated in the experimental part.

The solid content of the dispersions was determined in weight percent using a Halogen dryer model HR73 from Mettler Toledo at 150° C. and 0.5 g of sample size.

GPC was measured on an Agilent 1260 Infinity apparatus against polystyrene standards in 5 mg/ml THF solutions on 2 sequential PolyPore 300 mm×7.5 mm Agilent columns at 40° C. and 1 ml/min flow. Detection of the signals was done by refractive index and the data were processed using Agilent GPC/SEC Software Version 1.2. Reported values refer to weight average molecular weights (Mw) and were rounded to the nearest hundreds digit.

The following examples illustrate the invention.

Comparative example C1 according to PCT/EP2017/055423

For the preparation of a stable oil/water emulsion 280 g of melted behenylacrylate was dissolved in 164.4 g of Solvesso 150 ND and stirred until a homogenous and clear solution was obtained. To this solution, under stirring, 70.0 g of Lutensol AT 18 and 282.3 g of Joncryl 8078 dissolved in 112.3 g of water were slowly added. Subsequently 127.9 g of 1,2-propanediol were added to the emulsion while stirring.

After stirring for 15 min and treatment with an APV homogenizer at 300 bar a stable mini-emulsion was obtained with an average droplet size below 300 nm.

The emulsion was heated up to 60° C. under a nitrogen atmosphere. 56.0 g of tert-butyl hydroperoxide (10% solution in water) was added. Subsequently, 42.75 g of ascorbic acid (20% solution in water) was added over a period of 1.5 hours to the reaction mixture.

The reaction mixture was continuously stirred by a mechanical stirrer and was maintained at 60° C. for one hour, then cooled to RT and filtered via a 125 mm filter. No coagulum was found. The final dispersion was obtained as a white opaque, slightly viscous liquid.

The resulting particle size of the dispersion D50 was 333 nm, the solid content was 33.1% and the Mw was 45400 g/mol. The dynamic viscosity was 225 mPas (RT).

Surfactant A (Synthesis of anionic phosphate surfactant from non-ionic surfactant Lutensol AO 5)

In a three necked flask with thermometer, cooler and nitrogen inlet, 200 g of Lutensol AO 5 (1 equiv) was heated to 40° C. under a $N_2$ atmosphere. Under vigorous stirring, 52.4 g of Polyphosphoric acid (pre-heated to 60° C., 0.33 equiv) was introduced slowly in a few minutes. The reaction mixture was exothermic and subsequently stirred at 90° C. for one hour. The resulting slightly yellowish and clear polymer had a solid content of 99.1% and an acid value of 252 mg KOH/g. For obtaining a water soluble surfactant, the polymer was cooled to 40° C. Then 170 g of it was transferred slowly to a stirred solution of 15 g of NaOH dissolved in 300 g of water, until a pH of 7.5 was reached, while stirring at 60° C. The clear polymer solution was foamy and had a solid content of 37.7%, and was used as such.

Surfactant B (Synthesis of anionic carboxylic acid surfactant in form of succinic acid mono ester from non-ionic surfactant Lutensol AO 5)

In a three necked flask with thermometer, cooler and nitrogen inlet, 200 g of Lutensol AO 5 (1 equiv) was heated to 40° C. under $N_2$ atmosphere. Under stirring, 46.6 g of succinic anhydride flakes (1 equiv) were was introduced slowly in a few minutes. The reaction mixture was heated to 150° C. in 4 hours and stirred for two hours. The acid value was 103 mg KOH/g. After cooling to 50° C., 69.5 g of triethanolamine (1 equiv) was added dropwise in a few minutes and stirred for 1 h at 50° C. The resulting polymer salt was a liquid viscous clear material with a pH of 7.0 (as 10% aqueous solution), and was used as such.

Surfactant C

Disponil FES 32 is commercially available.

Example 1—Surfactant C

For the preparation of a stable oil/water emulsion 280 g of melted behenylacrylate was dissolved in 164.4 g of Solvesso 150 ND and stirred until a homogenous and clear solution was obtained. While stirring, 93.3 g of Disponil FES 32 was added slowly, followed by 186.2 g of water and 127.9 g of 1,2-propanediol.

After stirring for 15 min and treatment with an APV homogenizer at 300 bar and a second pass at 100 bar, a stable emulsion was obtained with an average droplet size below 200 nm.

The emulsion was heated up to 60° C. under a nitrogen atmosphere. 61.1 g of tert-butyl hydroperoxide (10% solution in water) was added. Subsequently, 50.4 g of Brüggolit FF6M (20% solution in water) was added over a period of 2.5 hours to the reaction mixture.

The reaction mixture was continuously stirred by a mechanical stirrer and was maintained at 60° C. for one hour, then cooled to RT and filtered via a 125 mm filter. No coagulum was found. The final dispersion was obtained as a white opaque, slightly viscous liquid.

The resulting particle size of the dispersion D50 was 169 nm, the solid content was 31.5% and the Mw was 53200 g/mol. The dynamic viscosity was 100 mPas (RT).

Example 2—Surfactant A

For the preparation of a stable oil/water emulsion 280 g of melted behenylacrylate was dissolved in 164.4 g of Solvesso 150 ND and stirred until a homogenous and clear solution was obtained. While stirring, 74.3 g of Surfactant A was added slowly, followed by 215.6 g of water and 127.9 g of 1,2-propanediol.

After stirring for 15 min and treatment with an APV homogenizer at 300 bar and a second pass at 100 bar, a stable emulsion was obtained with an average droplet size below 200 nm.

The emulsion was heated up to 60° C. under a nitrogen atmosphere. 61.1 g of tert-butyl hydroperoxide (10% solution in water) was added. Subsequently, 50.4 g of Brüggolit FF6M (20% solution in water) was added over a period of 2.5 hours to the reaction mixture.

The reaction mixture was continuously stirred by a mechanical stirrer and was maintained at 60° C. for one hour, then cooled to RT and filtered via a 125 mm filter. No coagulum was found. The final dispersion was obtained as a white opaque, slightly viscous liquid.

The resulting particle size of the dispersion D50 was 139 nm, the solid content was 32.4% and the Mw was 49400 g/mol. The dynamic viscosity was 129 mPas (RT).

Example 3—Surfactant B

For the preparation of a stable oil/water emulsion 280 g of melted behenylacrylate was dissolved in 164.4 g of Solvesso 150 ND and stirred until a homogenous and clear solution was obtained. While stirring, 28.0 g of Surfactant B was added slowly, followed by 263.2 g of water and 127.9 g of 1,2-propanediol.

After stirring for 15 min and treatment with an APV homogenizer at 300 bar and a second pass at 100 bar, a stable emulsion was obtained with an average droplet size below 200 nm.

The emulsion was heated up to 60° C. under a nitrogen atmosphere. 61.1 g of tert-butyl hydroperoxide (10% solution in water) was added. Subsequently, 50.4 g of Brüggolit FF6M (20% solution in water) was added over a period of 2.5 hours to the reaction mixture.

The reaction mixture was continuously stirred by a mechanical stirrer and was maintained at 60° C. for one hour, then cooled to RT and filtered via a 125 mm filter. No coagulum was found. The final dispersion was obtained as a white opaque, slightly viscous liquid.

The resulting particle size of the dispersion D50 was 191 nm, the solid content was 30.7% and the Mw was 57300 g/mol. The dynamic viscosity was 94 mPas (RT).

Example 4—Copolymer with n-butylacrylate

For the preparation of a stable oil/water emulsion 266 g of melted behenylacrylate and 14.0 g of n-butylacrylate were dissolved in 164.4 g of Solvesso 150 ND and stirred until a homogenous and clear solution was obtained. While stirring, 186.2 g of Disponil FES 32 was added slowly, followed by 93.3 g of water and 127.9 g of 1,2-propanediol.

After stirring for 15 min and treatment with an APV homogenizer at 300 bar and a second pass at 100 bar, a stable emulsion was obtained with an average droplet size below 200 nm.

The emulsion was heated up to 60° C. under a nitrogen atmosphere. 61.1 g of tert-butyl hydroperoxide (10% solution in water) was added. Subsequently, 50.4 g of Brüggolit FF6M (20% solution in water) was added over a period of 2.5 hours to the reaction mixture.

The reaction mixture was continuously stirred by a mechanical stirrer and was maintained at 60° C. for one hour, then cooled to RT and filtered via a 125 mm filter. No coagulum was found. The final dispersion was obtained as a white opaque, slightly viscous liquid.

The resulting particle size of the dispersion D50 was 147 nm, the solid content was 35.0% and the Mw was 51700 g/mol. The dynamic viscosity was 145 mPas (RT).

Examples 5 to 8

The following examples were prepared according to procedure example 4 with the comonomers listed in below table, instead of n-butylacrylate, and was replaced by weight:

| Example | Comonomer | Solid content | Particle size D50 | Dyn. Viscosity (mPas) | Mw (g/mol) |
|---|---|---|---|---|---|
| 5 | styrene | 34.0% | 151 nm | 110 | 38100 |
| 6 | 2-ethylhexyl acrylate | 34.0% | 154 nm | 124 | 50300 |
| 7 | methyl methacrylate | 33.9% | 147 nm | 122 | 51400 |
| 8 | 2-hydroxyethyl methacrylate | 34.0% | 200 nm | 440 | 50500 |

All dispersions were obtained free of coagulum as white opaque slightly viscous liquids.

Example 9-15% Ionic Surfactant

For the preparation of a stable oil/water emulsion 280 g of melted behenylacrylate was dissolved in 164.4 g of Solvesso 150 ND and stirred until a homogenous and clear solution was obtained. While stirring, 140 g of Disponil FES 32 was added slowly, followed by 186.2 g of water and 127.9 g of 1,2-propanediol.

After stirring for 15 min and treatment with ultrasound for 2 minutes, a stable emulsion was obtained with an average droplet size below 200 nm.

The emulsion was heated to 60° C. under a nitrogen atmosphere. 61.1 g of tert-butyl hydroperoxide (10% solution in water) was added. Subsequently, 50.4 g of Brüggolit FF6M (20% solution in water) was added over a period of 2.5 hours to the reaction mixture.

The reaction mixture was continuously stirred by a mechanical stirrer and was maintained at 60° C. for one hour, then cooled to RT and filtered via a 125 mm filter. No coagulum was found. The final dispersion was obtained as a white opaque, slightly viscous liquid.

The resulting particle size of the dispersion D50 was 167 nm, the solid content was 32.2% and the Mw was 61500 g/mol. The dynamic viscosity was 185 mPas (RT).

Example C2—with Protective Colloid

For the preparation of a stable oil/water emulsion 280 g of melted behenylacrylate was dissolved in 164.4 g of Solvesso 150 ND and stirred until a homogenous and clear solution was obtained. While stirring, 225.81 g of Joncryl 8078, 65,3 g of Disponil FES 32 (7 pphm, parts per hundred parts of monomer) were added slowly, followed by 252 g of water and 127.9 g of 1,2-propanediol.

After stirring for 15 min and treatment with an APV homogenizer at 300 bar, a stable emulsion was obtained with an average droplet size below 200 nm.

The emulsion was heated up to 60° C. under a nitrogen atmosphere. 56.0 g of tert-butyl hydroperoxide (10% solution in water) was added. Subsequently, 28.0 g of Brüggolit FF6M (20% solution in water) was added over a period of 1.5 hours to the reaction mixture.

The reaction mixture was continuously stirred by a mechanical stirrer and was maintained at 60° C. for one hour, then cooled to RT and filtered via a 125 mm filter. No coagulum was found. The final dispersion was obtained as a white opaque, slightly viscous liquid.

The resulting particle size of the dispersion D50 was 162 nm, the solid content was 34.3% and the Mw was 53000 g/mol.

Examples C3 and C4

The following examples were prepared according to procedure C2 with variation in the amount of surfactant, while keeping the other ingredients the same, as indicated in below table.

| Example | Surfactant | Solid content | Particle size D50 | Mw (g/mol) |
|---|---|---|---|---|
| C3 | 10 pphm Disponil FES 32 (93.3 g) | 31.0% | 193 nm | 50500 |
| C4 | 15 pphm Disponil FES 32 (140.0 g) | 32.2% | 185 nm | 54100 |

Example C5

Example C5 corresponds to example 1 except that Solvesso 150 NT was omitted so that example C5 does not contain component c) (hydrophobic organic solvent).

Stability of the Dispersions:

The stability of the dispersions was tested at three different temperatures: −10° C., room temperature (21-23° C.) and 50° C. 20 ml of each dispersion were stored in glass bottles at the three different temperatures for several days (see Table 1). The dispersions were accurately observed. It was checked if they showed a separation or creaming/sedimentation. To quantify the stability of the dispersion the following criteria were developed:

1: Dispersion was stable and homogeneous. No creaming/sedimentation or separation could be observed. Dispersion was also fluid. No solidification or gelling.

2: Dispersion was stable with slight streaking formation. No creaming/sedimentation or separation could be observed. Dispersion was also fluid. No solidification or gelling 3: Dispersion showed a separation. Creaming or sedimentation might be observed. Some dispersions did not flow anymore.

In addition to the visual check, the solid content of the dispersions was measured. For this, 1.0 g from the top and 1.0 g from the bottom of the sample were taken and the solid content of each aliquot was determined. (Measurement conditions: 1.0 g sample, temperature 120° C., fully automatic end point recognition: no weight difference for 24 seconds). For the solid content measurement, a Sartorius moisture analyzer type MA 150 was used. A difference of 5 absolute %-values between the solid content of the top aliquot and that of the bottom aliquot indicated that the dispersion was unstable

| Example | Storage/ days | Stability[A] RT | Solid content[B]/ % at RT | | Stability[A] −10° C. | Solid content[B]/ % at −10° C. | |
|---|---|---|---|---|---|---|---|
| | | | top | bottom | | top | bottom |
| C1 | 9 | 1 | 34.9 | 34.7 | 2 | 35.3 | 36.6 |
| 1 | 21 | 1 | 38.1 | 34.9 | 1 | 33.7 | 35.2 |
| 2 | 9 | 1 | 33.6 | 33.8 | 1 | 33.6 | 33.5 |
| 3 | 9 | 1 | 34.4 | 33.9 | 1 | 34.1 | 34.1 |

| Example | Storage/ days | Stability[A] 50° C. | Solid content[B]/ % at 50° C.[C] | |
|---|---|---|---|---|
| | | | top | bottom |
| C1 | 9 | 3 | 47.9 | 25.0 |
| 1 | 21 | 1 | 36.3 | 35.2 |
| 2 | 9 | 1 | 33.2 | 33.4 |
| 3 | 9 | 1 | 33.6 | 33.0 |

A: stability of dispersion:

1: Dispersion was stable and homogeneous. No creaming/sedimentation or separation could be observed. Dispersion was also fluid. No solidification or gelling.

2: Dispersion was stable with slight streaking formation. No creaming/sedimentation or separation could be observed. Dispersion was also fluid. No solidification or gelling 3: Dispersion showed a separation. Creaming or sedimentation might be observed. Some dispersions did not flow anymore.

B: Solid content (dry weight) in %.

| Example | Storage/ days | Stability[A] RT | Solid content[B]/ % at RT | | Stability[A] −10° C. | Solid content[B]/ % at −10° C. | |
|---|---|---|---|---|---|---|---|
| | | | top | bottom | | top | bottom |
| C1 | 9 | 1 | 34.9 | 34.7 | 2 | 35.3 | 36.6 |
| 1 | 21 | 1 | 38.1 | 34.9 | 1 | 33.7 | 35.2 |
| 4 | 21 | 1 | 35.4 | 35.4 | 1 | 36.2 | 36.3 |
| 5 | 21 | 1 | 34.1 | 34.2 | 1 | 34.4 | 34.8 |
| 6 | 21 | 1 | 33.7 | 35.8 | 1 | 35.2 | 35.1 |

| | | -continued | | | | | |
|---|---|---|---|---|---|---|---|
| 7 | 21 | 1 | 34.9 | 34.8 | 1 | 35.4 | 35.1 |
| 8 | 21 | 1 | 34.1 | 35.4 | 2 | 36.6 | 35.8 |

| Example | Storage/ days | Stability[A] 50° C. | Solid content[B]/ % at 50° C. | |
|---|---|---|---|---|
| | | | top | bottom |
| C1 | 9 | 3 | 47.9 | 25.0 |
| 1 | 21 | 1 | 36.3 | 35.2 |
| 4 | 21 | 2 | 35.1 | 34.8 |
| 5 | 21 | 2 | 34.5 | 32.9 |
| 6 | 21 | 1 | 34.7 | 35.3 |
| 7 | 21 | 1 | 34.7 | 33.7 |
| 8 | 21 | 2 | 34.5 | 34.0 |

A: stability of dispersion:

1: Dispersion was stable and homogeneous. No creaming/sedimentation or separation could be observed. Dispersion was also fluid. No solidification or gelling.

2: Dispersion was stable with slight streaking formation. No creaming/sedimentation or separation could be observed. Dispersion was also fluid. No solidification or gelling 3: Dispersion showed a separation. Creaming or sedimentation might be observed. Some dispersions did not flow anymore.

B: Solid content (dry weight) in %.

Pour Point Determination of Crude Oil Treated with Dispersions

The pour point (PP) and no flow point (NFP) was determined with a Pour Point-Tester 45150 from PSL (Osterode am Harz, Germany). The pour point is measured according to ASTM D5985. As crude oil, a Wintershall oil from the Landau region, Germany, was used. The crude oil has a API of 37°.

A 2 liter aluminum bottle containing the crude oil was heated to 80° C. for 30 minutes. During the heating process the bottle was shaken repeatedly to homogenize the crude oil. Then 50 ml of the crude oil were transferred to a 100 ml plastic bottle. The bottle was heated to 80° C. again for 15 minutes. After that 1000 ppm of the dispersion were added to the crude oil. Then the crude oil with the dispersion was shaken. Finally, the sample was heated to 80° C. again for 15 min. Approximately 30 ml of the sample were then transferred to the cup of the pour point tester so that it was filled up to the calibration line. The cup was inserted into the pour point tester, the sensor head was put into the sample and the measuring was started. The sample was firstly heated until 70° C. before the pour point measurement was started.

Performance of samples stored at room temperature

| Sample | PP/° C. 1000 ppm | NFP/° C. 1000 ppm |
|---|---|---|
| blank | 21 | 18.5 |
| C1 | 12 | 11.5 |
| 1 | 9 | 6.0 |
| 2 | 9 | 6.1 |
| 3 | 6 | 5.8 |
| 4 | 9 | 7.3 |
| 5 | 12 | 9.7 |
| 6 | 9 | 8.5 |
| 7 | 9 | 6.4 |
| 8 | 9 | 7.1 |
| C5 | 28 | 17.6 |

Performance of samples stored at 50° C.

| Sample | PP/° C. 1000 ppm | NFP/° C. 1000 ppm |
|---|---|---|
| Blank | 21 | 18.5 |
| C1 | 12 | 10.8 |
| 1 | 6 | 5.6 |
| 2 | 9 | 6.6 |
| 3 | 9 | 7.7 |
| 4 | 9 | 7.2 |
| 5 | 12 | 9.7 |
| 6 | 9 | 8.8 |
| 7 | 9 | 6.9 |
| 8 | 9 | 7.5 |
| C5 | 21 | 18.0 |

| Example | Storage/ days | Stability[A] RT | Solid content[B]/ % at RT | | Stability[A] −10° C. | Solid content[B]/ % at −10° C | |
|---|---|---|---|---|---|---|---|
| | | | top | bottom | | top | bottom |
| 1 | 21 | 1 | 38.1 | 34.9 | 1 | 33.7 | 35.2 |
| C2 | 10 | 3 | 35.8 | 25.1 | 1 | 32.9 | 32.2 |
| C3 | 10 | 3 | 35.2 | 20.4 | 3 | 33.9 | 27.4 |
| C4 | 10 | 3 | 36.1 | 23.2 | 3[C] | 33.5 | 32.4 |
| C5 | 28 | 3 | 67.0 | 33.7 | 3 | 53.4 | 34.0 |

| Example | Storage/ days | Stability[A] 50° C. | Solid content[B]/ %[C] at 50° C. | |
|---|---|---|---|---|
| | | | top | bottom |
| 1 | 21 | 1 | 36.3 | 35.2 |
| C2 | 10 | 3 | 50.5 | 19.4 |

-continued

| | | | | |
|---|---|---|---|---|
| C3 | 10 | 3 | 39.7 | 19.8 |
| C4 | 10 | 3 | 43.3 | 20.5 |
| C5 | 28 | 3 | 63.9 | 25.5 |

A: stability of dispersion:

1: Dispersion was stable and homogeneous. No creaming/sedimentation or separation could be observed. Dispersion was also fluid. No solidification or gelling.

2: Dispersion was stable with slight streaking formation. No creaming/sedimentation or separation could be observed. Dispersion was also fluid. No solidification or gelling 3: Dispersion showed a separation. Creaming or sedimentation might be observed. Some dispersions did not flow anymore.

B: Solid content (dry weight) in %.

C: dispersion is solid.

Wax Inhibition—Cold Finger Test

The cold finger deposition test was utilized to determine the wax inhibition properties of the dispersions. The wax inhibition was determined by exposing the crude oil to a cold metal finger surface in the presence and absence of the inhibitor. The amount and type of wax deposited on the cold metal finger was used to determine waxing tendency. For the tests, a crude oil from the "Landau" oilfield in south-west Germany (Wintershall Holding GmbH) having an API gravity of 37 and a pour point of 21° C. was used. The test was started by conditioning the oil sample by heating to 80° C. and holding for 30 minutes to remove thermal history. A water bath on the cold finger apparatus was adjusted so that the oil temperature was maintained at 30° C. The cold finger was maintained at 15° C. and the cold finger was inserted into the oil sample. The test was run for 6 hours. The cold finger was removed, and the wax deposit on it was collected with a paper towel. The wax deposit was weighed. The wax test was repeated in the presence and absence of the inventive dispersion. The amount of dispersion used was 1000 ppm with respect to crude oil. The percent efficacy was calculated on the performance of paraffin inhibitor as compared to the baseline (i.e. the measurement without wax inhibitor. The results are summarized in the following table:

| Example | Cold finger test wax deposition/g | Wax inhibition/% |
|---|---|---|
| Blank | 2.84 | — |
| 1 | 1.76 | 38 |

The invention claimed is:

1. Aqueous polymer dispersion comprising water and
a) 10 to 60% by weight based on the dispersion of at least one polymer P obtainable by the reaction of reactive monomers M, wherein the reactive monomers M consist of
50 to 100% by weight of at least one monomer M1 of the general formula (I)

$$H_2C=CH—C(O)OR \quad (I)$$

wherein R is an unbranched alkyl chain comprising from 18 to 22 carbon atoms; and
0 to 50% by weight of at least one monomer M2, which is different from monomer M1 and selected from the group consisting of acrylate monomers of the general formula (II), $$H_2C=CH—C(O)OR^3 \quad (II),$$

wherein $R^3$ is a branched or unbranched alkyl chain comprising from 1 to 12 carbon atoms, optionally substituted with a hydroxyl group;
methacrylate monomers of the general formula (III)

$$H_2C=C(CH_3)—C(O)OR^4 \quad (III),$$

wherein $R^4$ is a branched or unbranched alkyl chain comprising from 1 to 12 carbon atoms, optionally substituted with a hydroxyl group; and
vinylic aromatic monomers;
wherein the amounts of the monomers M1 and M2 are each based on the total amount of all reactive monomers M used in the reaction,
wherein the polymer P has a weight-average molecular weight $M_w$ of 20,000 to 150,000 g/mol according to DIN 55672-1:1995-02; and
wherein the polymer P is present in the form of particles having an average particle size $d_{50}$ of from 50 nm to 1000 nm effected by Column Hydrodynamic Chromatography;
b) 5 to 60% by weight based on the total amount of the aqueous polymer dispersion of at least one water miscible solvent,
c) 5 to 40% by weight based on the total amount of the aqueous polymer dispersion of at least one hydrophobic organic solvent,
d) 0.1 to 20% by weight based on the total amount of the aqueous polymer dispersion of at least one ionic surfactant.

2. Aqueous polymer dispersion of claim 1, wherein the dispersion further comprises less than 10% by weight based on the total amount of monomers M of at least one protective colloid.

3. Aqueous polymer dispersion according to claim 1, wherein the at least one monomer M1 is a mixture, comprising
40 to 55% by weight, based on the total amount of monomers M1, of monomers M1 of formula (I), wherein R is an unbranched alkyl chain comprising 18 carbon atoms;
10 to 15% by weight, based on the total amount of monomers M1, of monomers M1 of formula (I), wherein R is an unbranched alkyl chain comprising 20 carbon atoms; and
35 to 45% by weight, based on the total amount of monomers M1, of monomers M1 of formula (I), wherein R is an unbranched alkyl chain comprising 22 carbon atoms.

4. Aqueous polymer dispersion according to claim 1, wherein the amount of the at least one monomer M2 is from 0 to 10% by weight based on the total amount of all reactive monomers M.

5. Aqueous polymer dispersion according to claim 1, wherein the at least one monomer M2 is selected from the group consisting of
acrylate monomers of the general formula (II), $$H_2C=CH—C(O)OR^3 \quad (II),$$

wherein $R^3$ is a branched or unbranched alkyl chain comprising from 1 to 12 carbon atoms, optionally substituted with a hydroxyl group;

methacrylate monomers of the general formula (III)

$$H_2C{=}C(CH_3)OR^4 \qquad (III),$$

wherein $R^4$ is a branched or unbranched alkyl chain comprising from 1 to 12 carbon atoms, optionally substituted with a hydroxyl group.

6. Aqueous polymer dispersion according to claim 1, wherein the at least one monomer M2 is styrene, 2-ethylhexylacrylate, methylmethacrylate, 2-hydroxyethylmethacrylate or n-butyl acrylate.

7. Aqueous polymer dispersion according to claim 1, wherein the at least one water miscible solvent is a glycol.

8. Aqueous polymer dispersion according to claim 1, wherein the at least one hydrophobic organic solvent is an aromatic or aliphatic hydrocarbon or a mixture thereof.

9. Aqueous polymer dispersion according to claim 1, wherein the at least one ionic surfactant is anionic surfactant.

10. Aqueous polymer dispersion according to claim 1, wherein the at least one ionic surfactant is an anionic surfactant of formula (IV)

$$R^5{-}O{-}(D)_l{-}(B)_m{-}(A)_n{-}XY^-M^+, \qquad (IV)\ \text{where}$$

$R^5$ is a linear or branched, saturated or unsaturated, aliphatic and/or aromatic hydrocarbon radical having 8 to 30 carbon atoms, A is ethyleneoxy, B is propyleneoxy, and D is butyleneoxy, l is from 0 to 30, m is from 0 to 30 and n is from 0 to 30, X is $(CH_2)_a[C(O)]_b(CH_2)_c$, where a and c are independently from 0 to 4 and b 0 or 1;

$M^+$ is a cation, and $Y^-$ is $SO_3^-$, $PO_3^{2-}$ or $C(O)O^-$, where the A, B and D groups may be distributed randomly, alternatingly, or in the form of two, three, four or more blocks in any sequence, and wherein the sum of l+m+n is in the range from 0 to 30.

11. Aqueous polymer dispersion according to claim 10, wherein the at least one surfactant is an anionic surfactant of the general formula (IVa)

$$R^5{-}O{-}(CH_2CH_2O)_nXY^- \qquad (IVa)$$

wherein $R^5$, n, X and $Y^-$ have the meaning as indicated in claim 10.

12. Aqueous polymer dispersion according to claim 10, wherein $R^5$ is a linear, saturated and aliphatic hydrocarbon radical having 10 to 20 carbon atoms and/or l is 0 and/or m is 0 to 3 and/or n is 1 to 30 and/or XY is $SO_3^-$; $PO_3^{2-}$ or $C(O)CH_2CH_2C(O)O^-$.

13. Aqueous polymer dispersion according to claim 1, wherein the polymer P has a weight-average molecular weight $M_w$ of 20 000 to 100 000 g/mol.

14. Method for the preparation of the aqueous polymer dispersion claim 1, comprising the steps of
  a) preparation of an aqueous monomer dispersion comprising
    a1) 10 to 60% by weight based on the total amount of the resulting aqueous polymer dispersion of reactive monomers M, wherein the reactive monomers M consist of
      50 to 100% by weight based on the total amount of the reactive monomers M of at least one monomer M1 of the general formula (I)

$$H_2C{=}CH{-}C(O)OR \qquad (I),\ \text{and}$$

0 to 50% by weight based on the total amount of the reactive monomers M of at least one monomer M2, which is different from monomer M1 and defined as in claim 1,
      wherein the amounts of the monomers M1 and M2 are each based on the total amount of all reactive monomers M;
    a2) 5 to 40% by weight based on the total amount of the resulting aqueous polymer dispersion of at least one hydrophobic organic solvent;
    a3) 5 to 60% by weight based on the total amount of the resulting aqueous polymer dispersion of at least one water miscible solvent;
    a4) 0.1 to 20% by weight based on the total amount of the resulting aqueous polymer dispersion of at least one ionic surfactant; and
  b) ultrasonic processing or homogenization of the aqueous monomer dispersion of step a);
  c) addition of at least one polymerization initiator.

15. Method according to claim 14, wherein the mixture obtained in step a) is treated for at least 5 minutes.

16. Method according to claim 14, wherein after step b) the aqueous monomer dispersion is obtained in form of a miniemulsion.

17. Aqueous polymer dispersion of claim 1, wherein the dispersion is free of protective colloids.

* * * * *